United States Patent
Nott et al.

(10) Patent No.: US 11,759,950 B2
(45) Date of Patent: Sep. 19, 2023

(54) LOCALIZED CONFIGURATIONS OF DISTRIBUTED-PACKAGED ROBOTIC PROCESSES

(71) Applicant: UiPath, Inc., New York, NY (US)

(72) Inventors: Brandon Nott, Bellevue, WA (US); Florin-Radu Tapus, Bucharest (RO)

(73) Assignee: UIPATH, INC., New York, NY (US)

( * ) Notice: Subject to any disclaimer, the term of this patent is extended or adjusted under 35 U.S.C. 154(b) by 414 days.

(21) Appl. No.: 17/150,607

(22) Filed: Jan. 15, 2021

(65) Prior Publication Data

US 2022/0072704 A1 Mar. 10, 2022

Related U.S. Application Data (60) Provisional application No. 63/075,620, filed on Sep. 8, 2020.

(51) Int. Cl.
*G06Q 10/10* (2023.01)
*B25J 9/16* (2006.01)
*G05B 19/4155* (2006.01)

(52) U.S. Cl.
CPC ........ *B25J 9/1656* (2013.01); *G05B 19/4155* (2013.01); *G06Q 10/10* (2013.01); *G05B 2219/2661* (2013.01)

(58) Field of Classification Search
CPC .................................................. B25J 9/1656
See application file for complete search history.

(56) References Cited

U.S. PATENT DOCUMENTS

| 8,799,174 | B1 | 8/2014 | Mitchell et al. |
| 9,552,239 | B2 | 1/2017 | Kumar et al. |
| 9,558,031 | B2 | 1/2017 | Cismas et al. |
| 2005/0234592 | A1 | 10/2005 | McGee et al. |
| 2007/0112912 | A1 | 5/2007 | Weber et al. |
| 2010/0241990 | A1* | 9/2010 | Gabriel ............ G06Q 10/06 715/810 |
| 2014/0282015 | A1 | 9/2014 | Nixon et al. |
| 2017/0001308 | A1 | 1/2017 | Bataller et al. |

(Continued)

FOREIGN PATENT DOCUMENTS

KR  2020-0082839 A  7/2020

OTHER PUBLICATIONS

European Search Report for Application No. 21 80 1402 dated Dec. 1, 2022.

(Continued)

*Primary Examiner* — Afaf Osman Bilal Ahmed
(74) *Attorney, Agent, or Firm* — Volpe Koenig (57) ABSTRACT

Disclosed herein is a computing device that includes a memory and a processor. The memory stores processor executable for a robotic process engine. The robotic process engine accesses a distributed packaged robotic process to procure code and generate a local robotic process. The code includes parameters, while local robotic process includes input fields in accordance with the parameters. The robotic process engine receives input arguments via the input fields of the local robotic process to generate a configuration and executes the local robotic process utilizing the configuration. The execution of the local robotic process mirrors an execution of the distributed packaged robotic process without changing the distributed packaged robotic process.

20 Claims, 9 Drawing Sheets

(56) References Cited

U.S. PATENT DOCUMENTS

| | | |
|---|---|---|
| 2017/0011322 A1 | 1/2017 | Thomas |
| 2017/0052824 A1 | 2/2017 | Sharma et al. |
| 2019/0332508 A1 | 10/2019 | Goyal et al. |
| 2020/0004798 A1* | 1/2020 | Weinert, Jr. ........ G06F 16/9577 |

OTHER PUBLICATIONS

International Written Opinion and Search Report for Application No. PCT/US21/499453 dated Dec. 21, 2021.

* cited by examiner

LOCALIZED CONFIGURATIONS OF DISTRIBUTED-PACKAGED ROBOTIC PROCESSES

BACKGROUND

Design computing platforms enable developers to design, package, and transfer robotic process automation (RPA) workflows to local computing devices. These RPA workflows can be self-contained and are only used for specific tasks. Yet, RPA workflows require the design computing platforms (on which they were created) for reconfiguration so that they can be reused, such as for a slightly different task within the local computing devices. Thus, it is desirable to provide an improved configuration technique to manipulate RPA workflows in the local computing devices.

SUMMARY

According to one or more embodiments, a computing device is provided. The computing device includes a memory and a processor. The memory store processor executable instructions for a robotic process engine. The robotic process engine accesses a distributed packaged robotic process to procure code and generate a local robotic process. The code includes parameters, while local robotic process includes input fields in accordance with the parameters. The robotic process engine receives input arguments via the input fields of the local robotic process to generate a configuration and executes the local robotic process utilizing the configuration. The execution of the local robotic process mirrors an execution of the distributed packaged robotic process without changing the distributed packaged robotic process.

According to one or more embodiments, the computing device embodiment above can be implemented as a method, an apparatus, a system, and/or a computer program product.

BRIEF DESCRIPTION OF THE DRAWING(S)

A more detailed understanding may be had from the following description, given by way of example in conjunction with the accompanying drawings, wherein like reference numerals in the figures indicate like elements, and wherein.

DETAILED DESCRIPTION

Disclosed herein is a robotic process engine according to one or more embodiments. The robotic process engine includes software and/or hardware that performs localized configurations of distributed-packaged robotic processes. More particularly, the robotic process engine provides a specific configuring and tooling robotic process automation method for improved configuration techniques to manipulate a distributed packaged robotic process in a local computing system. The robotic process engine can be a combination of hardware (e.g., a processor) and software (e.g., processor executable code that is necessarily rooted in the hardware).

In this regard, the configuring and tooling robotic process automation method includes a framework/mechanism to reuse distributed-packaged robotic processes (e.g., robots, robotic processes, and/or RPA workflows originated from design computing platforms) with respect to different configurations. The framework/mechanism can include a process list (e.g., that can be provided in a robot tray) that identifies the distributed-packaged robotic processes. The distributed-packaged robotic processes, once locally stored, can be cycled through to run each of the distributed-packaged robotic processes with respect to one or more different configurations. The configurations can be "feed" to each of the distributed-packaged robotic processes so that the distributed-packaged robotic processes are reused according to the configurations (e.g., as per the developers/orchestrators need). Thus, the configuring and tooling robotic process automation method of the robotic process engine involves a multi-step data manipulation of distributed-packaged robotic processes and different configurations in connection with design computing platforms and local computing systems.

In an example operation, the robotic process engine accesses a distributed packaged robotic process to procure code and generate a local robotic process. The code includes parameters, while local robotic process includes input fields in accordance with the parameters. The robotic process engine receives input arguments via the input fields of the local robotic process to generate a configuration and executes the local robotic process utilizing the configuration. The execution of the local robotic process mirrors an execution of the distributed packaged robotic process without changing the distributed packaged robotic process. The technical effects and benefits of the robotic process engine include enabling a reuse of a distributed packaged robotic process without changing any underlying code (e.g., the parameters or default values associated therewith).

For the methods and processes described herein, the steps recited may be performed out of sequence in any order and sub-steps not explicitly described or shown may be performed. In addition, "coupled" or "operatively coupled" may mean that objects are linked but may have zero or more intermediate objects between the linked objects. Also, any combination of the disclosed features/elements may be used in one or more embodiments. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic.

Figure 1A:
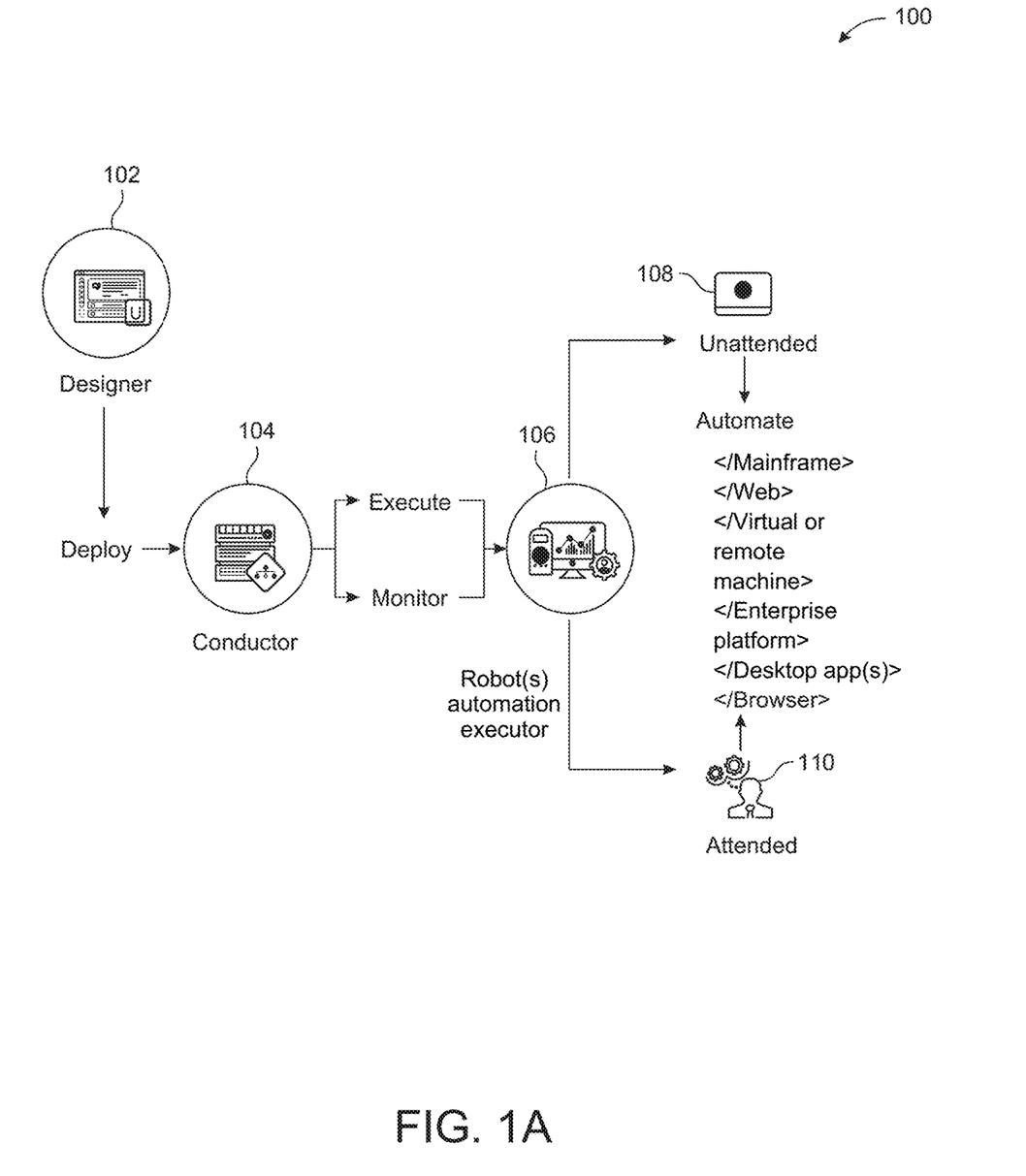
FIG. 1A is an illustration of robotic process automation (RPA) development, design, operation, or execution according to one or more embodiments.

FIG. 1A is an illustration of robotic process automation (RPA) development, design, operation, or execution 100. Designer 102, sometimes referenced as a studio, development, or online platform including one or more engines (e.g., a robotic process engine), development environment, or the like may be configured to generate code, instructions, commands, or the like for a robot to perform or automate one or more workflows. From a selection(s), which the computing system may provide to the robot, the robot may determine representative data of the area(s) of the visual display selected by a user or operator. As part of RPA, shapes such as squares, rectangles, circles, polygons, freeform, or the like in multiple dimensions may be utilized for UI robot development and runtime in relation to a computer vision (CV) operation or machine learning (ML) model.

Non-limiting examples of operations that may be accomplished by a workflow may be one or more of performing log-ins, filling a form, information technology (IT) management, or the like. To run a workflow for UI automation, a robot may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language (HTML), HTML5, extensible markup language (XML), JavaScript, JavaScript object notation (JSON) format, C#, C++, Silverlight, or the like.

A workflow may include, but are not limited to, task sequences, flowcharts, Finite State Machines (FSMs), global exception handlers, or the like (e.g., scripting for unstructured data, such as documents files in any format). Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like.

A robot may be an application, applet, script, or the like, that may automate a UI transparent to an underlying operating system (OS) or hardware. At deployment, one or more robots may be managed, controlled, or the like by a conductor 104, sometimes referred to as an orchestrator. Conductor 104 may instruct or command robot(s) or automation executor 106 to execute or monitor a workflow in a mainframe, web, virtual machine, remote machine, virtual desktop, enterprise platform, online platform, desktop app(s), browser, or the like client, application, or program. Conductor 104 may act as a central or semi-central point to instruct or command a plurality of robots to automate a computing platform (e.g., a design computing platform).

In certain configurations, conductor 104 may be configured for provisioning, deployment, configuration, queueing, monitoring, logging, and/or providing interconnectivity. Provisioning may include creating and maintenance of connections or communication between robot(s) or automation executor 106 and conductor 104. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robot(s) or automation executor 106 may be configured as unattended 108 or attended 110. For unattended 108 operations, automation may be performed without third party inputs or control. For attended 110 operation, automation may be performed by receiving input, commands, instructions, guidance, or the like from a third-party component. Unattended 108 or attended 110 robots may run or execute on mobile computing or mobile device environments.

A robot(s) or automation executor 106 may be execution agents that run workflows built in designer 102. A commercial example of a robot(s) for UI or software automation is UiPath Robots™. In some embodiments, robot(s) or automation executor 106 may install the Microsoft Windows® Service Control Manager (SCM)-managed service by default. As a result, such robots can open interactive Windows® sessions under the local system account, and have the rights of a Windows® service.

In some embodiments, robot(s) or automation executor 106 may be installed in a user mode. These robots may have the same rights as the user under which a given robot is installed. This feature may also be available for High Density (HD) robots, which ensure full utilization of each machine at maximum performance such as in an HD environment.

In certain configurations, robot(s) or automation executor 106 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between conductor 104 and the execution hosts (i.e., the computing systems on which robot(s) or automation executor 106 is executed). These services may be trusted with and manage the credentials for robot(s) or automation executor 106.

User mode robot services may manage and monitor Windows® sessions and act as a proxy between conductor 104 and the execution hosts. User mode robot services may be trusted with and manage the credentials for robots. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display available jobs in the system tray window. Agents may be a client of the service. Agents may request to start or stop jobs and change settings. The command line may be a client of the service. The command line is a console application that can request to start jobs and waits for their output.

In configurations where components of robot(s) or automation executor 106 are split as explained above helps developers, support users, and computing systems more easily run, identify, and track execution by each component. Special behaviors may be configured per component this way, such as setting up different firewall rules for the executor and the service. An executor may be aware of DPI settings per monitor in some embodiments. As a result, workflows may be executed at any DPI, regardless of the configuration of the computing system on which they were created. Projects from designer 102 may also be independent of browser zoom level. For applications that are DPI-unaware or intentionally marked as unaware, DPI may be disabled in some embodiments.

Figure 1B:
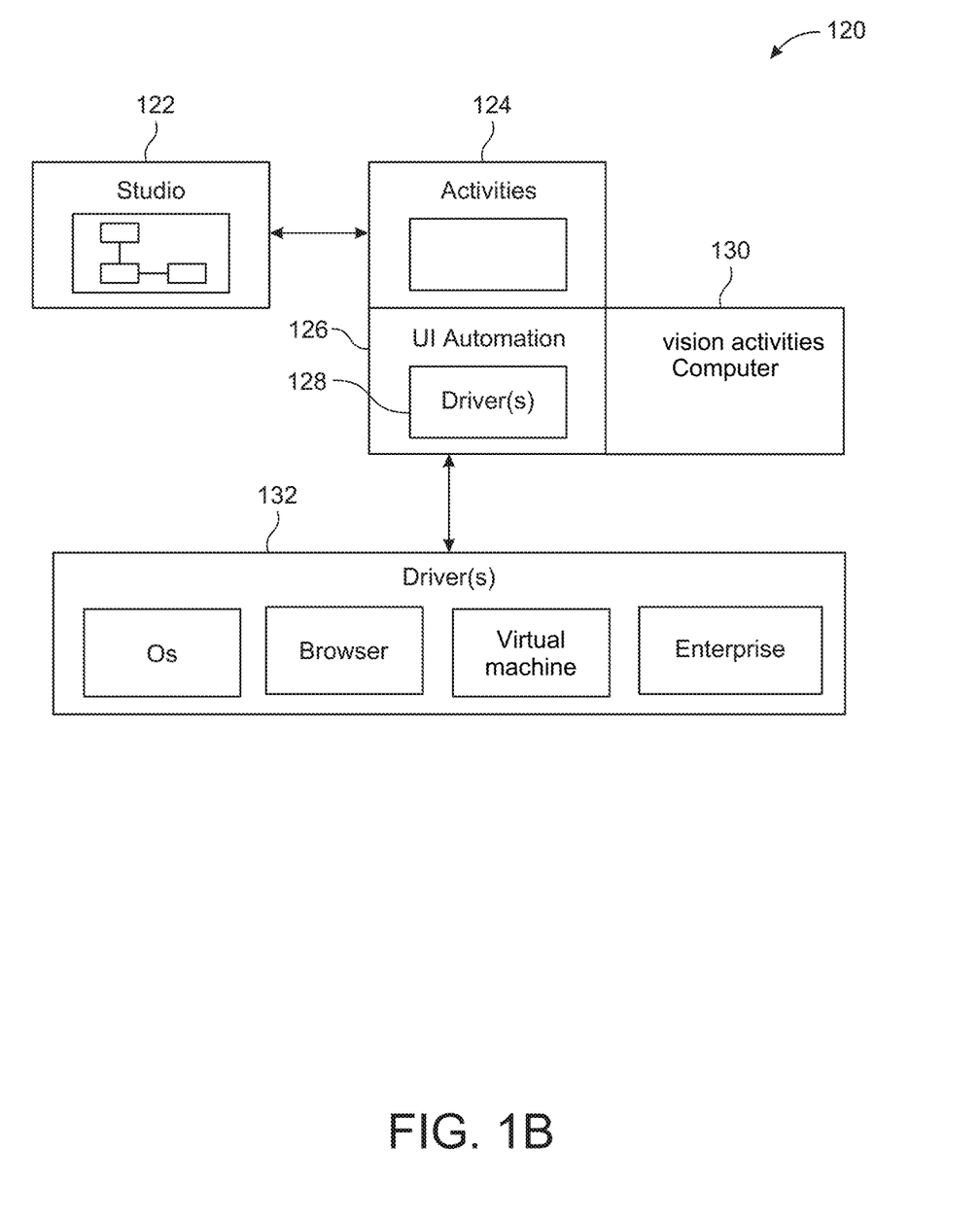
FIG. 1B is another illustration of RPA development, design, operation, or execution according to one or more embodiments.

FIG. 1B is another illustration of RPA development, design, operation, or execution 120. A studio component or module 122 may be configured to generate code, instructions, commands, or the like for a robot to perform one or more activities 124. User interface (UI) automation 126 may be performed by a robot on a client using one or more driver(s) components 128. A robot may perform activities using computer vision (CV) activities module or engine 130 (e.g., a robotic process engine). Other drivers 132 may be utilized for UI automation by a robot to get elements of a UI. They may include OS drivers, browser drivers, virtual machine drivers, enterprise drivers, or the like. In certain configurations, CV activities module or engine 130 may be a driver used for UI automation.

According to one or more embodiments of RPA development, design, operation, or execution 120 of FIG. 1B, the studio component or module 122 can design processes (such as a robotic process) will be execute by robots. Further, the studio component or module 122 can pass the designed processes to a robotic process engine for execution. Note that the robotic process engine can, thus, incorporate the designed even if the computing environment of the robotic process engine does not include the studio component or module 122. In this way, for example, the designed processes can be procured, bought, and/or traded without the need to already have the studio component or module 122 implemented locally. Indeed, the designed processes can be regarded as standalone units of automation that act and behave very much like applications or installers (e.g., the robotic process engine is an "operating system" for the designed to be installed and executed within on local computers).

Figure 1C:
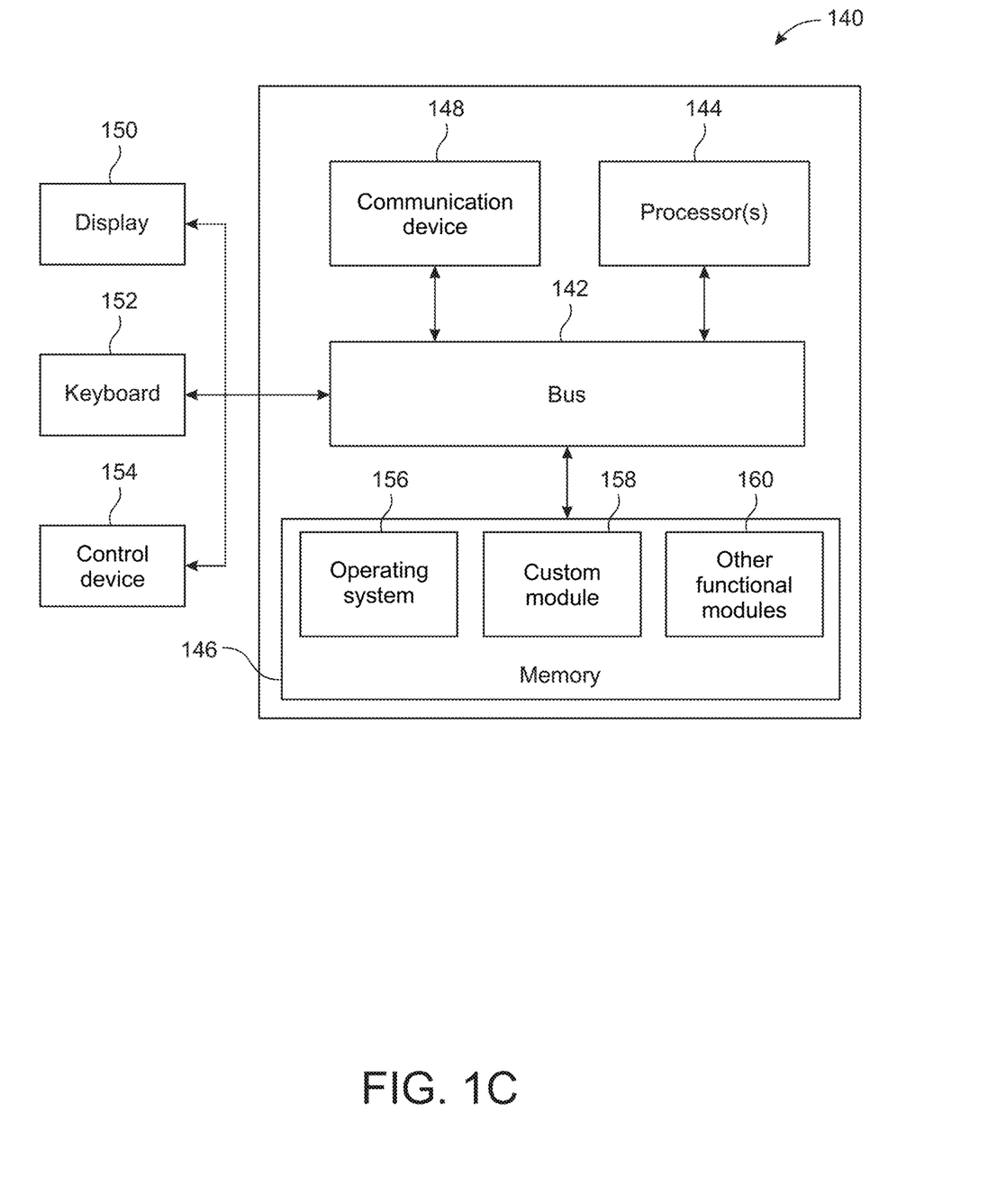
FIG. 1C is an illustration of a computing system or environment according to one or more embodiments.

FIG. 1C is an illustration of a computing system or environment 140 (e.g., hardware supporting an online platform and/or a robotic process engine) that may include a bus 142 or other communication mechanism for communicating information or data, and one or more processor(s) 144 coupled to bus 142 for processing. One or more processor(s) 144 may be any type of general or specific purpose processor, including a central processing unit (CPU), application specific integrated circuit (ASIC), field programmable gate array (FPGA), graphics processing unit (GPU), controller, multi-core processing unit, three-dimensional processor, quantum computing device, or any combination thereof. One or more processor(s) 144 may also have multiple processing cores, and at least some of the cores may be configured to perform specific functions. Multi-parallel processing may also be configured. In addition, at least one or more processor(s) 144 may be a neuromorphic circuit that includes processing elements that mimic biological neurons.

Memory 146 may be configured to store information, instructions (e.g., processor executable instructions of a robotic process engine, along with distributed-packaged robotic processes and configurations), commands, or data to be executed or processed by processor(s) 144. Memory 146 can be comprised of any combination of random-access memory (RAM), read only memory (ROM), flash memory, solid-state memory, cache, static storage such as a magnetic or optical disk, or any other types of non-transitory computer-readable media or combinations thereof. Non-transitory computer-readable media may be any media that can be accessed by processor(s) 144 and may include volatile media, non-volatile media, or the like. The media may also be removable, non-removable, or the like.

Communication device 148, may be configured as a frequency division multiple access (FDMA), single carrier FDMA (SC-FDMA), time division multiple access (TDMA), code division multiple access (CDMA), orthogonal frequency-division multiplexing (OFDM), orthogonal frequency-division multiple access (OFDMA), Global System for Mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication via one or more antennas. Antennas may be singular, arrayed, phased, switched, beamforming, beamsteering, or the like.

One or more processor(s) 144 may be further coupled via bus 142 to a display device 150, such as a plasma, liquid crystal display (LCD), light emitting diode (LED), field emission display (FED), organic light emitting diode (OLED), flexible OLED, flexible substrate displays, a projection display, 4K display, high definition (HD) display, a Retina© display, in-plane switching (IPS) or the like based display. Display device 150 may be configured as a touch, three-dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

A keyboard 152 and a control device 154, such as a computer mouse, touchpad, or the like, may be further coupled to bus 142 for input to computing system or environment 140. In addition, input may be provided to computing system or environment 140 remotely via another computing system in communication therewith, or computing system or environment 140 may operate autonomously.

Memory 146 may store software components, modules, engines, or the like that provide functionality when executed or processed by one or more processor(s) 144. This may include an OS 156 for computing system or environment 140. Modules may further include a custom module 158 to perform application specific processes or derivatives thereof. Computing system or environment 140 may include one or more additional functional modules 160 that include additional functionality. For example, the robotic process engine can be implemented in one or more of the modules 158 and 160 to provide a specific configuring and tooling robotic process automation method to the computing system or environment 140.

Computing system or environment 140 may be adapted or configured to perform as an online platform, a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like.

In the examples given herein, modules may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may be at least partially implemented in software for execution by various types of processors. An identified unit of executable code may include one or more physical or logical blocks of computer instructions that may, for instance, be organized as an object, procedure, routine, subroutine, or function. Executables of an identified module co-located or stored in different locations such that, when joined logically together, comprise the module.

A module of executable code may be a single instruction, one or more data structures, one or more data sets, a plurality of instructions, or the like distributed over several different code segments, among different programs, across several memory devices, or the like. Operational or functional data may be identified and illustrated herein within modules, and may be embodied in a suitable form and organized within any suitable type of data structure.

In the examples given herein, a computer program may be configured in hardware, software, or a hybrid implementation. The computer program may be composed of modules that are in operative communication with one another, and to pass information or instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

Figure 2:
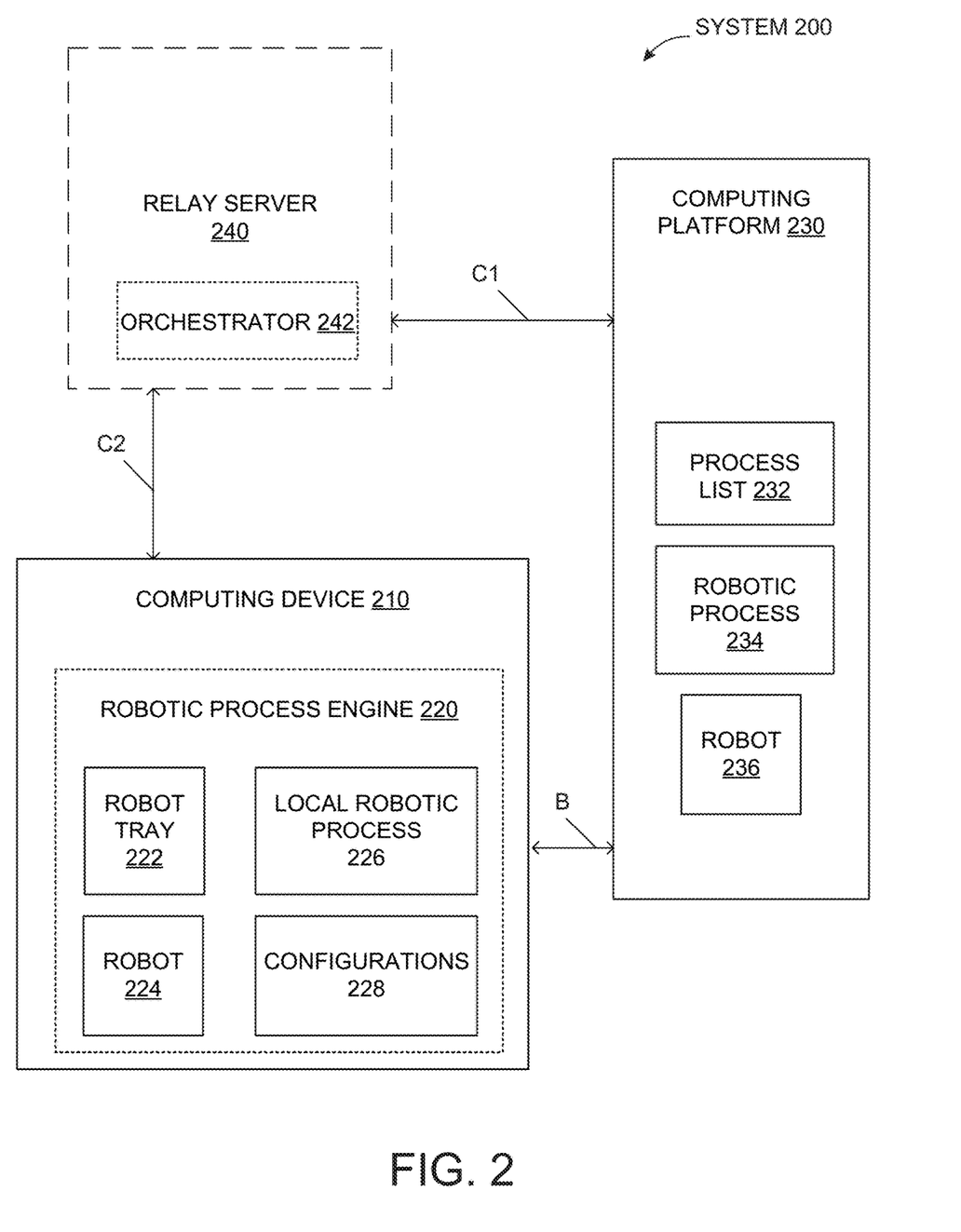
FIG. 2 is an illustration of a system according to one or more embodiments.
Figure 3:
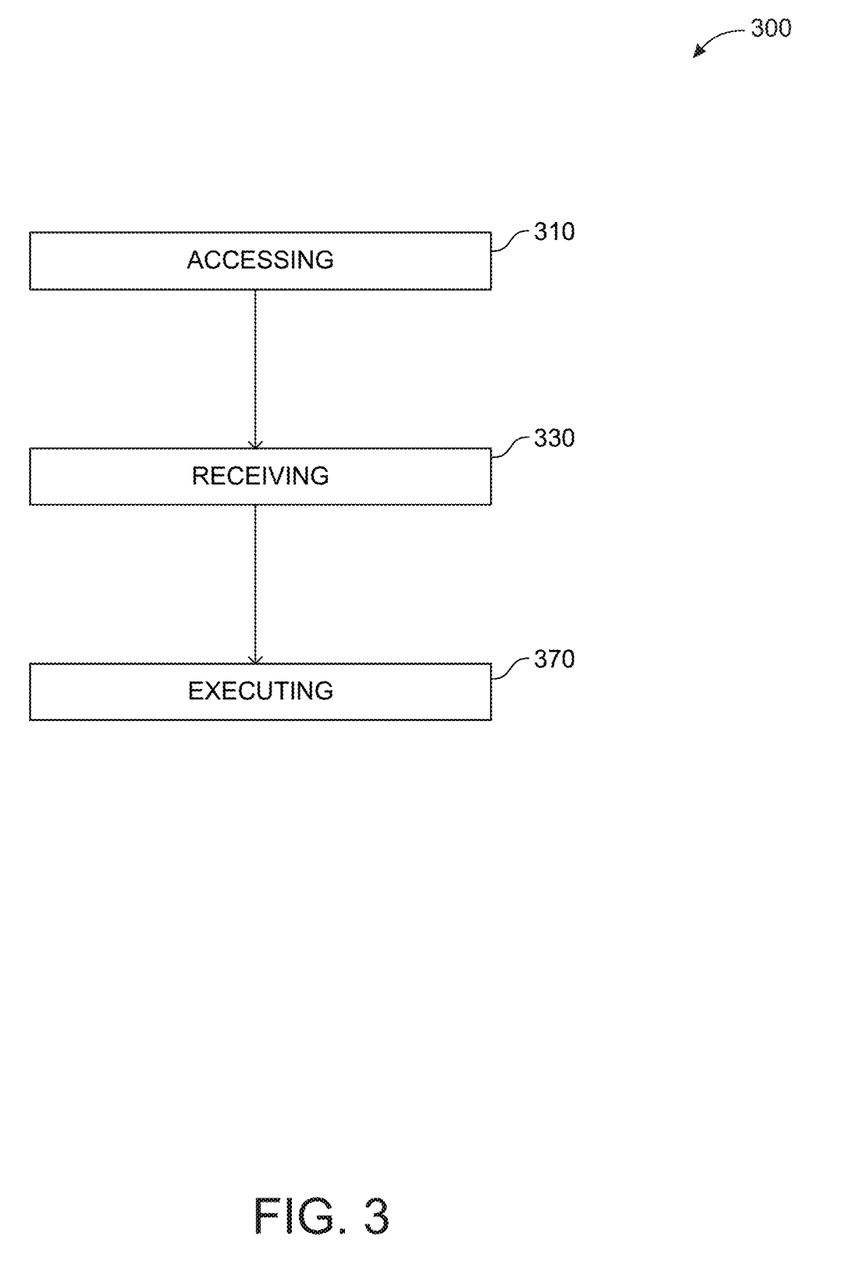
FIG. 3 is a block diagram illustrating a process flow executed by a robotic process engine according to one or more embodiments.
Figure 4:
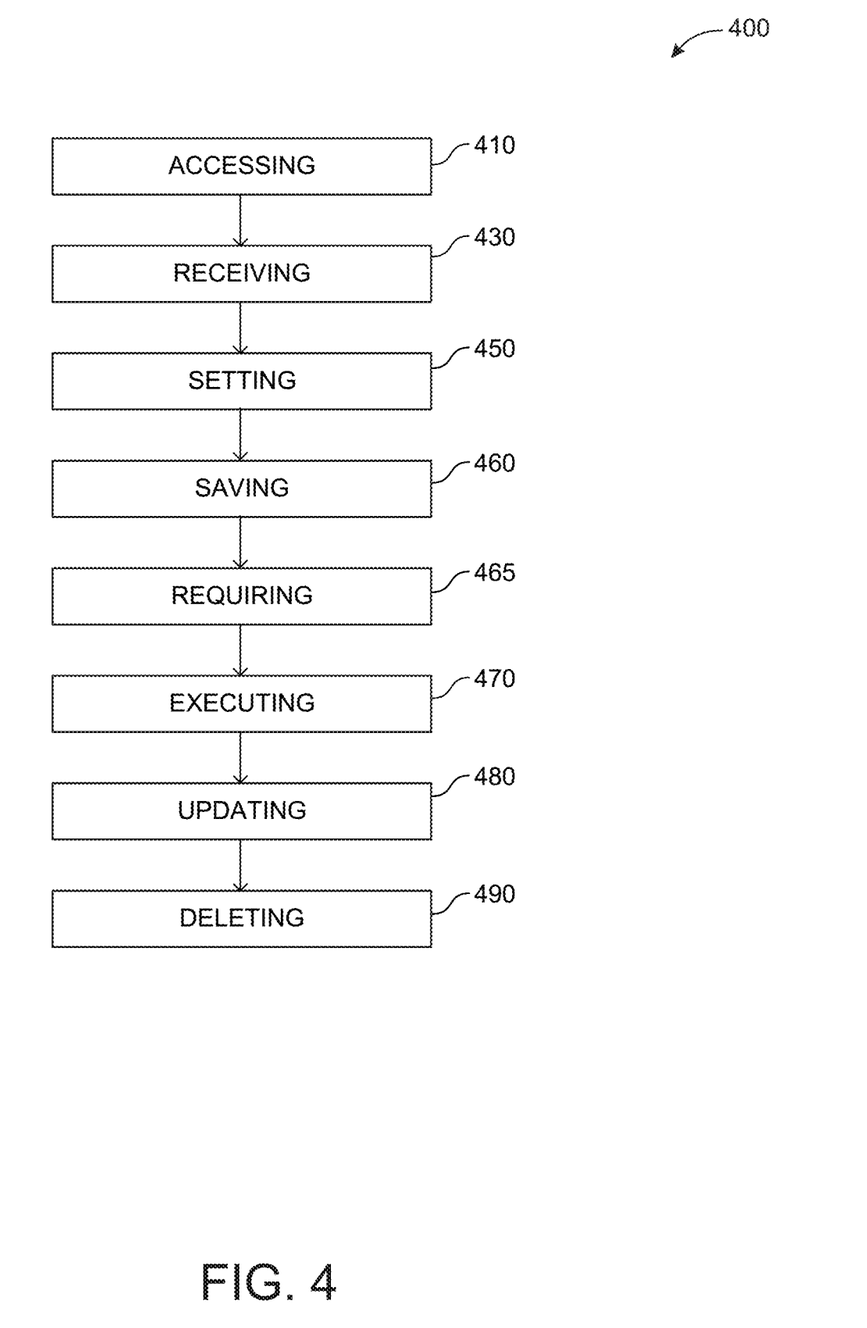
FIG. 4 is a block diagram illustrating a process flow executed by a robotic process engine according to one or more embodiments.

Turning now to FIGS. 2-4, components and operations of the robotic process engine are described according to one or more embodiments. FIG. 2 is an illustration of a system 200 (e.g., software and/or hardware that performs localized configurations of distributed-packaged robotic processes). As shown in FIG. 2, the system 200 includes a computing device 210 that operates a robotic process engine 220. The robotic process engine 220 includes at least a robot tray 222, a robot 224, a local robotic process 226, and a configuration 228. The system 200 includes a computing platform 230 that includes a process list 232, a robotic process 234, and a robot 236. The system 200 includes a relay platform 240 that includes an orchestrator 242, as described herein. Further, while a single block is shown for each item (or component) of the system 200, that single block is representative of one or more of that item (or component), and the singular and plural forms may be used interchangeably herein.

The computing device 210, which is an example of a computing system or environment 140 of FIG. 1, communicates with the computing platform 230 (as shown by the arrow B). The computing device 210 is representative of one or more user devices, each including at least a processor, a memory, and a display with a user interface. Examples of the computing device 210 include, but are not limited to, a personal computer, a PDA, a cell phone, a tablet computing device, a mobile device, a desktop device and a smartphone. The computing platform 230 is representative of one or more software-, infrastructure-, platform-based services that provide networks, servers, storage services, operating systems, database services, and security services (e.g., the robotic process engine 220) to the computing device 210 (e.g., the computing platform 230 can be a cloud systems and/or service).

Note the computing device 210 and the computing platform 230 can optionally communicate via the relay server 240 (as shown by the arrows C1 and C2; a dashed border of the relay server 240 indicates this component as optional). The relay server 240 can be structurally similar to the computing device 210 and/or the computing platform 230 and can have the orchestrator 242 therein. Note also that the arrows B, C1, and C2 within the system 200 are representative of communications transmitted over wired and/or wireless connections, networks, and the like.

Generally, the robotic process engine 220 is software and/or hardware that performs localized configurations of distributed-packaged robotic processes (e.g., robots 236, robotic processes 234, and/or RPA workflows originated from design computing platforms). Thus, as shown in the example of FIG. 2, the robotic process engine 220 is stored and executed within the computing device 210.

In accordance with one or more embodiments, the localized configuration and process operations of the robotic process engine 220 are implemented by hardware and/or processor executable instructions, computer code, and/or programming languages. Further, in accordance with one or more embodiments, the localized configuration and process operations of the robotic process engine 220 can be part of a framework/mechanism (which allows orchestrators 242 and the conductor 104 of FIG. 1) to reuse distributed-packaged robotic processes.

The robotic process engine 220 can operate on more or more processors/devices/systems to support localized distributed process configuration for distributed-packaged robotic processes. For instance, the robotic process engine 220 can be optionally executed in multiple iterations across one or more systems, devices, and environments, such as within the computing platform 230 and the relay server 240. For example, while the robotic process engine 220 is shown as local to the computing platform 230, the robotic process engine 220 can also be, or in the alternative, local to the computing platform 230 or a stand-alone hardware/software combination that is in communication with the other components of the system 200.

The process list 232 is an itemization of all the distributed-packaged robotic processes (e.g., the robotic process 234 and the robot 236) on the computing platform 230 and available to orchestrators 242 and the robotic process engine 220. The robotic process 234 can be a robotic process and/or RPA workflow originated from the computing platform 230 defining parameters that have default values associated therewith. The robot 236 (e.g., like the robot 224) can be an application, applet, script, or the like and can also define parameters and associated default values. The robot 236 can be configured to automate a UI transparent to an underlying operating system (OS) or hardware, as described herein. Thus, the robotic process 234 and the robot 236 can be a distributed packaged robotic process built at or within the computing platform 230.

For example, the computing platform 230 stores one or more distributed-packaged robotic processes (e.g., including the process 234 and the robot 236), which are further distributed by the computing platform 230. In an embodiment, the robotic process 234 (e.g., or the robot 236) includes one or more parameters and associated default values. The parameters are mechanisms defining features, ranges, properties, conditions and/or other types within the robotic process 234, and the default values are predefined arguments for the parameters. The parameters are used, by the robotic process engine 220 to create one or more input fields that accept one or more input arguments. The one or more input arguments can include settings, initial settings, and/or default settings. For instance, the input arguments can be a value (e.g., such as an initialized variable or literal), a string, a Boolean state, and/or an instruction that defines the parameters. The input fields can be a process construction that is respective to different types of parameters and that receives corresponding input arguments. For instance, if the parameter is a Boolean operator, then the input fields can include two checkboxes while the input arguments can be checkmarks relative to each Boolean state. Other examples of input fields include, but are not limited to, a text field for receiving a string, a number picker, and a date picker for a date and time selection, along with other complex forms.

The robot tray 222 provides interface framework of functionalities where at least a list of distributed-packaged robotic processes (e.g., the robot 224 and the local robotic process 226) are shown, accessed, manipulated, and configured. For example. the robot tray 222 can be considered a user interface that visually displays shapes in multiple dimensions for UI robot development and runtime in relation to a CV operation or ML model. The robot 224 can be an example of a copy of code of the robot 236, and the local robotic process 226 is an example of a copy of code of the robotic process 234.

The configuration(s) 228 can store initial settings and/or default settings as the one or more input arguments, which are generally used by the robotic process engine 220 to execute any local distributed-packaged robotic processes (e.g., the robot 224 and the local robotic process 226). In one or more examples, the configuration(s) 228 can be in a HTML format and/or JavaScript JSON format. According to one or more embodiments, the robotic process engine 220 can enable a single argument to be complex or simple (e.g., simple or complex forms of settings, initial settings, or default settings). With respect to simple, each instance of data (e.g., an employee name) can be passed through a single argument. With respect to complex, a number of data instances and types (e.g., employee names, frequency, dates, etc.) can be passed into a single argument. The configuration(s) 228 can be stored in a location (e.g., on the computing device 210) that can be accessed by one or more users, depending on a requirement of the one or more users, such as users who belong to same team can access a same configuration 228 on the computing device 210. In some cases, when the robotic process 234 is stored by the orchestrator 242, the robotic process 234 can be accessed by multiple users and used to generate the configurations 228 and the local robotic processes 226 locally (e.g., on the computing device 210). For example, turning now to FIG. 3, a block diagram illustrating a process flow 300 is shown according to one or more embodiments. More particularly, the process flow 300 is an example implementation of a method for localized configurations of distributed-packaged robotic processes by the robotic process engine 220 of the computing device 210 of FIG. 1.

The process flow 300 begins at block 310, where the robotic process engine 220 accesses the robotic process 234. Generally, the robotic process engine 220 can select (e.g., via robot tray 222) any distributed packaged robotic process (e.g., the robotic process 234 or the robot 236) from the process list 232 and download/receive a copy of code of that selected distributed packaged robotic process. The copy of the code includes at least one or more parameters. The computing device 210 can create the local robotic process 226 or the robot 224, accordingly, based on the copy of the code.

In the example of block 310, the robotic process engine 220 can be on the computing device 210, which is in communication with the computing platform 230, such that the robotic process 234 can be accessed via the process list 232. The robotic process 234 can be selected from the process list 232, which was pushed/published to the computing device 210 or pulled/published from the computing platform 230 (e.g., by the relay server 240). The robotic process engine 220 utilizes a copy of code of the robotic process 234, which includes one or more parameters, to generate and store the local robotic process 226, which includes one or more input fields that correspond to the one or more parameters. The technical effect and benefit of the robotic process engine 220 therefore includes being able to create the local robotic process 226 with a similar structure to the robotic process 234, without changing the robotic process 234.

At block 330, the robotic process engine 220 receives the one or more input arguments. The one or more input arguments are respective to the one or more input fields of the local robotic process 226 to generate the configuration 228 (e.g., the computing device 210 can create/build/store the configurations 228 on the memory therein). The configuration 228 can be a newly created configuration file specific to the one or more input arguments received and/or referred to as a local configuration file with the specific input set. The technical effect and benefit of the robotic process engine 220 therefore includes being able to create the configuration 228 without changing any default values associated with the robotic process 234.

At block 370, the robotic process engine 200 executes the local robotic process 226 (e.g., within the computing device 210) utilizing the configuration 228. The local robotic process 226 can access the memory of the computing device 210 to retrieve the one or more input arguments from the configuration 228. Thus, the technical effects and benefits of the process flow 200 and the robotic process engine 220 include enabling reuse the robotic process 234 as the local robotic process 226 without changing the robotic process 234 or default values thereof (e.g., the local robotic process 226, upon execution, mirrors an execution of the robotic process 234).

According to one or more embodiments, when the robotic process engine 220 has a plurality of local robotic processes 226 (and/or robots 224), the local robotic process 226 can use one or more configurations 226 to cycle through and execute each process of the plurality of local robotic processes 226. Thus, the technical effects and benefits of the robotic process engine 220 include enabling a local reuse of the distributed-packaged robotic processes within the process list 232 without changing any underlying code (e.g., parameters or associated default values).

Turning to FIG. 4, a block diagram illustrating a process flow 400 is shown according to one or more embodiments. More particularly, the process flow 400 is an example implementation of a method for localized configurations of distributed-packaged robotic processes by the robotic process engine 220 of the computing device 210 of FIG. 1.

The process flow 400 begins at block 410, where the robotic process engine 220 accesses the robotic process 234. According to an embodiment, the robotic process 234 can be acquired by the orchestrator 242 from the computing platform 230.

In an example, a VAT calculator process (e.g., the robotic process 234) is developed within the computing platform 230 and a "VAT Rate" parameter is added to the VAT calculator process. A default value for the "VAT Rate" parameter can be set to 10%. The VAT calculator process can be published within a process list, such as the process list 232. When the VAT calculator process is published into the orchestrator 242, the orchestrator 242 can override the default value (e.g., set it to 19% for Romania and 20% for France).

Next, the robotic process 234 can be acquired from the orchestrator 242 by the robotic process engine 220. Generally, the robotic process engine 220 can select (e.g., via robot tray 222) any distributed packaged robotic process (e.g., the robotic process 234) within orchestrator 242 and download/receive a copy of code of that selected distributed packaged robotic process. Accordingly, to one or more embodiments, the robotic process engine 220 can select any distributed packaged robotic process in which the robotic process engine 220 has permission. The computing device 210, in turn, creates the local robotic process 226, accordingly, based on the copy of the code, where the local robotic process 226 includes one or more input fields mirroring the robotic process 234. Note that the one or more input fields can mirror the parameters of the robotic process 234.

Continuing with the example of block 410, after the VAT calculator process is published within process list 232 and into the orchestrator 242, the orchestrator 242 prepares the VAT calculator process to be distributed to different local iterations of the computing device 210 (e.g., and the robotic process engine 220) in different countries (e.g., Romania and France) by overriding the default values. Then, the VAT calculator process (as represented by the local robotic process 226) arrives at the local iterations of the computing device 210 in Romania and France.

At blocks 430, 440, and 450, the robotic process engine 220 receives one or more input arguments via the one or more input fields to generate a configuration 228, sets that the configuration 228 on the computing device 210 for use by the local robotic process 226, and saves the configuration 228 with respect to the local robotic process 226. The configuration 228 enables end users to configure the local robotic process 226 without changing the robotic process 234.

The set operation enables the configuration 228 to be locally buffered in volatile memory of the computing device 210 so that the local robotic process 226 can be executed immediately. In this regard, the process configuration is queued (such as in a memory buffer) as an input to any distributed-packaged robotic processes to be executed on the computing system 210.

The save operation of block 460 can be separate from the set operation of block 450 in that the configuration 228 is locally saved/stored in the persistent memory of the computing device 210 under the save operation. In some embodiments, the configuration 228 can be stored in a remote database under the save operation. Any saved configurations (e.g., including the configuration 228) can be visible in the robot tray 222.

Continuing with the VAT calculator process example of blocks 410, when the VAT calculator process (as represented by the local robotic process 226) arrives at the local iterations of the computing device 210 in Romania and France, the "VAT Rate" parameter can be changed without affecting the published version on the relay server 240 and/or the robotic process 234 of the computing platform 230. Further, any values set locally are only available locally (e.g., as it is likely no end-user other local end-users will make use of it). Thus, the "VAT Rate" parameter can receive a default value that can be distributed across multiple orchestrators 242, and the multiple orchestrators 242 can change/provide the default value across multiple end-user groups (e.g., who then have a local value only available for themselves).

At block 465, the robotic process engine 220 requires a receipt of at least one required input of the one or more input arguments (i.e., before execution of the local robotic process 226). When starting local robotic process 226, the robotic process engine 220 can run an initial process with saved input data of the configuration 228. Any missing input data can be prompted for entry if it is required. The required input for reusing the local robotic process 226 can be different for different users.

Figure 5:
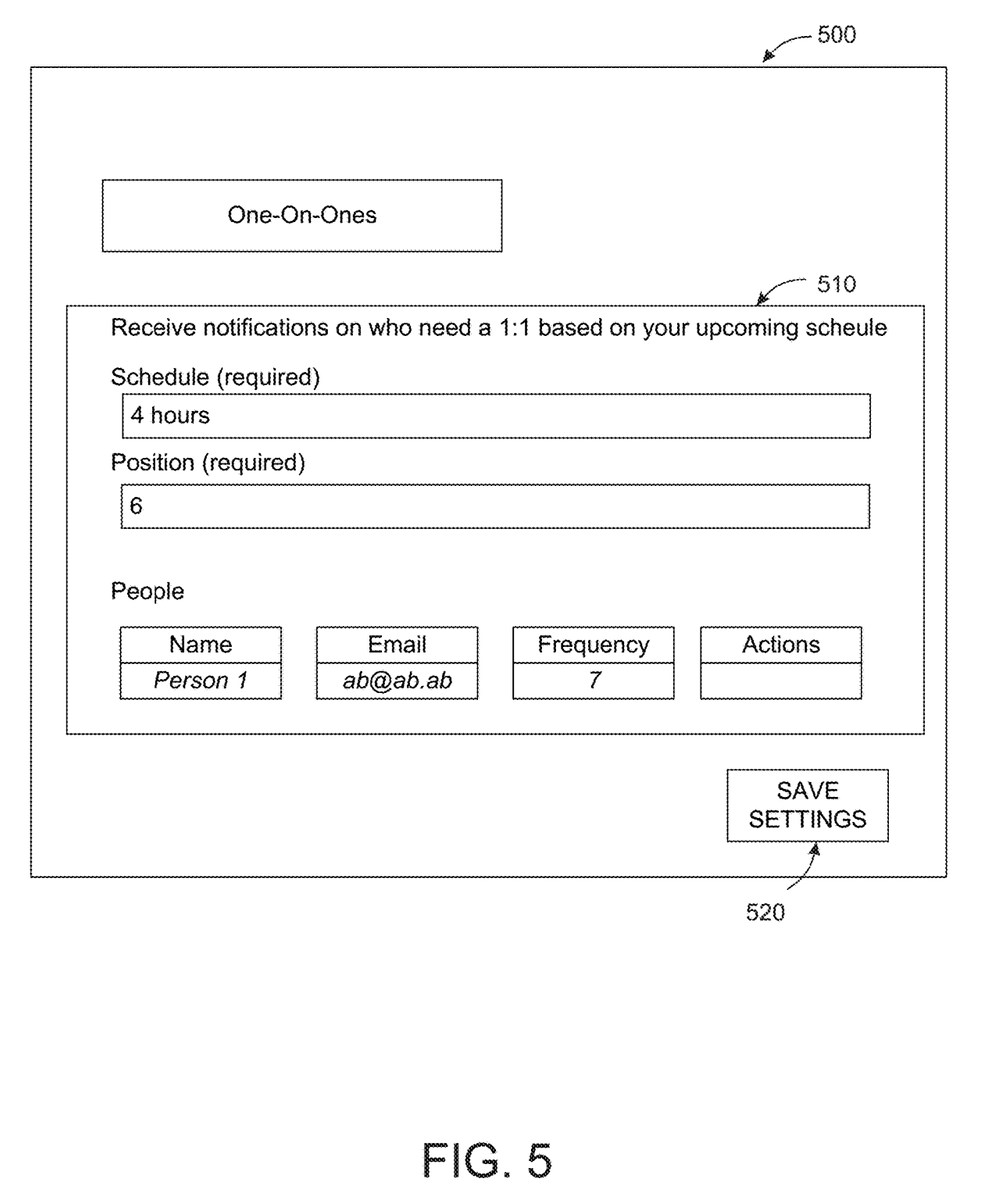
FIG. 5 a user interface is shown according to one or more embodiments.

For example, turning to FIG. 5, a user interface 500 is shown according to one or more embodiments. The user interface 500 (e.g., a process details page of the robotic process engine 220) includes at least a panel 510, which includes fields for submitting one or more input arguments. The user interface 500 includes a button 520, which enables the robotic process engine 220 to provide required input arguments (e.g., whether initially or before execution of the local robotic process 226) and/or save the one or more input arguments in the configuration 228. As shown, a "frequency" is set to 7 and only a single user (e.g., "Person 1") is entered in the input field for scheduling a meeting.

Thus, according to one or more embodiments, the user interface 500 can support a 'starting process' that takes input arguments. In this regard, the robotic process engine 220 prompts for values (if they have not been provided previously by the configuration 228). In turn, the user can set up input arguments from the user interface 500, which are later used when starting processes. The user can enter only valid values based on argument types. If an input argument is required, the user cannot start any process without inputting a valid value into the input field. The input fields can be pre-filled with local default values. The user can run a process without adding input arguments (e.g., skip).

The user interface 500, generally, illustrates configuring process configuration settings for "One-on-One" meeting scheduling process. The fields for the process configuration settings for the "One-on-One" meeting scheduling process include when to schedule a meeting, how long, with whom, how frequent the meeting is to be held, etc. The process configuration settings can be configured within the panel 510 as per a need to reuse a selected process (e.g., which is the local robotic process 226). After clicking on the button 520 to "save settings," the configuration 228 is generated (e.g., in a HTML and/or JSON format), set for use, and/or stored in a memory. Note that the process configuration settings can be manipulated at a design time and utilized at a run time. Further, note that any change in the process configuration settings modifies the configuration 228 or alternative creates a new configuration for the "One-on-One" meeting scheduling process. In turn, different users may generate different process configurations 228, which can be fed to the local robotic process 226.

At block 470, the robotic process engine 220 executes the local robotic process 226 (e.g., within the computing device 210) utilizing the configuration 228. The local robotic process 226 execution mirrors an execution of the robotic process 234 without changing the configuration 228. In operation, the local robotic process 226 can accesses a memory of the computing device 210 to retrieve the one or more input arguments of the configuration 228. The local robotic process 343 utilizes the one or more input arguments, which detail a user need. Note that, according to one or more embodiments, the local robotic process 226 can then cause output parameters to be displayed after execution. The output parameters can be saved within the computing device 210 and can also visible via a "history" section of a user interface.

At block 480, the robotic process engine 220 updates the local robotic process 226. That is, the configuration 228 (and arguments therein) can be used to create a new configuration package for the robotic process engine 220 (e.g., on the computing platform 230). Accordingly, when the robotic process 234 is updated, all saved configurations can use this updated package.

At block 490, the robotic process engine 220 deletes the local robotic process 226. Accordingly, when the local robotic process 226 is deleted, all saved configurations are deleted. That is, users can delete existing configurations 228 or users can delete the local robotic process 226, which in turn also deleted the configuration 228.

According to one or more embodiments, the robotic process engine 220 can acquire the process list 234 and all associated distributed-packaged robotic processes. Further, the robotic process engine 220 can cycle through each of the distributed packaged robotic processes therein for execution. In this way, each distributed packaged robotic process in the process list 232 is copied locally and fed input arguments of the configuration 228.

Figure 6:
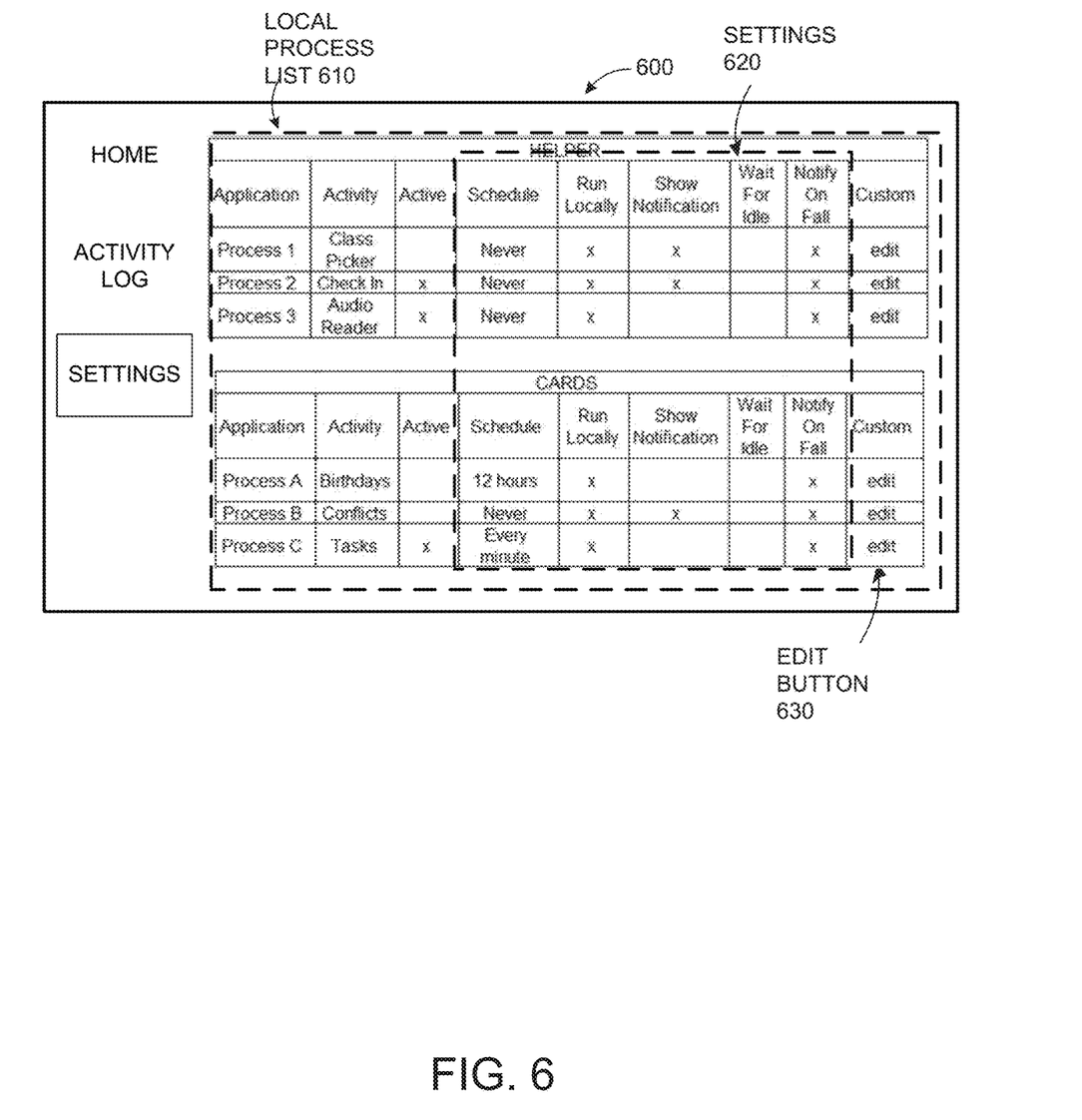
FIG. 6 a user interface is shown according to one or more embodiments.
Figure 7:
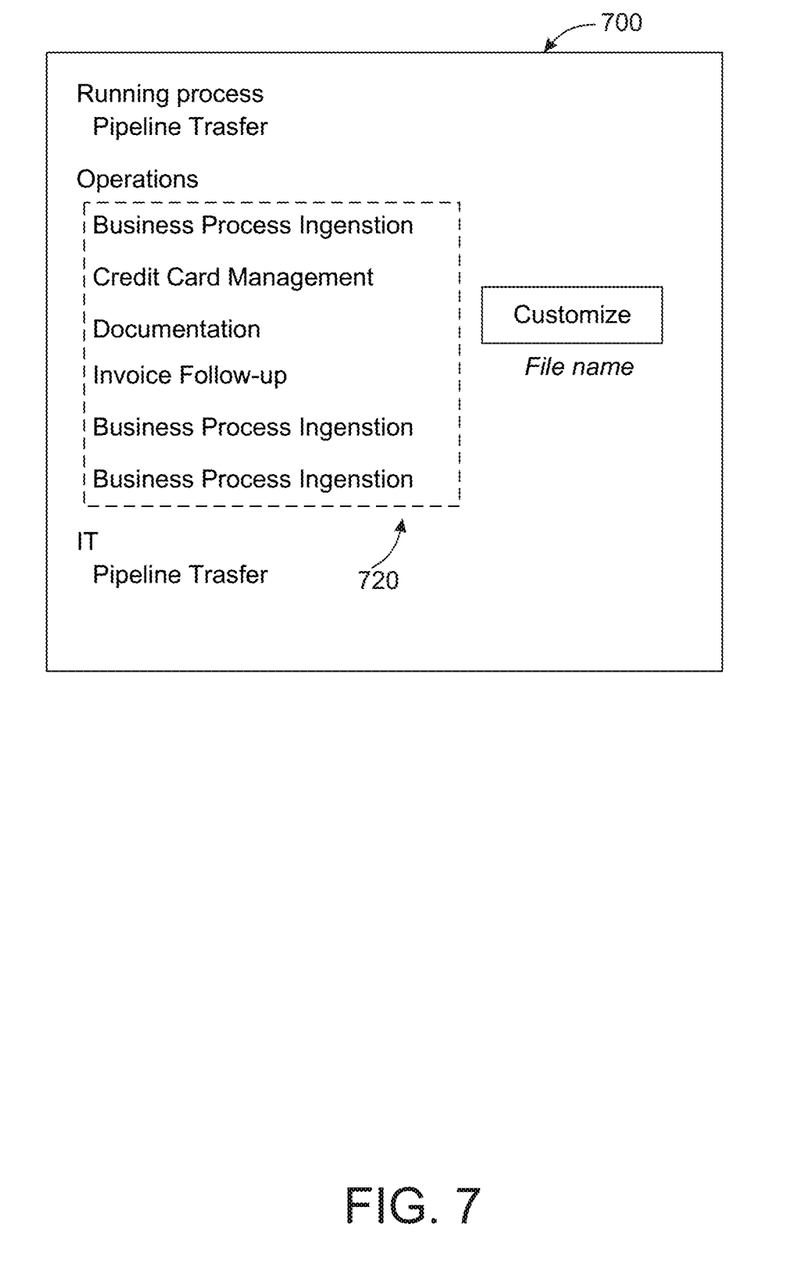
FIG. 7 a user interface is shown according to one or more embodiments.

The robotic process engine 220 is further described with respect to FIG. 6-7. As shown in FIG. 6, according to one or more embodiments, a user interface 600 includes at least a local process list 610, settings 620, and an edit button 630. The local process list 610 includes a list of all distributed-packaged robotic processes stored on the robotic process engine 220, which can be selected, accessed, and manipulated by the robotic process engine 220. The settings 620 describe when, where, how, and under what conditions particular distributed-packaged robotic process will execute. For example, if 'Wait For Idle' is selected for a particular distributed-packaged robotic process, that process will trigger when the computing device 210 is in idle mode. The edit button 630 provides an "edit" option to configure any process for reuse. By clicking on the edit button 630, a settings interface is visible (e.g., as described with respect to FIG. 5).

As shown in FIG. 7, according to one or more embodiments, a user interface 700 illustrates an example robot tray that includes a panel 720. The robot tray provides framework functionalities wherein a list of processes is imported and shown in the panel 720.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire Examples of computer-readable media include electrical signals (transmitted over wired or wireless connections) and computer-readable storage media. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random-access memory (RAM), a read-only memory (ROM), an erasable programmable read-only memory (EPROM or Flash memory), a static random-access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computing device comprising:
a memory configured to store processor executable instructions for a robotic process engine; and
at least one processor coupled to the memory,
wherein the at least one processor is configured to execute the robotic process engine to cause the computing device to perform:
accessing, by the robotic process engine, a distributed packaged robotic process to procure code comprising one or more parameters and generate a local robotic process comprising one or more input fields in accordance with the one or more parameters;
receiving, by the robotic process engine, one or more input arguments via the one or more input fields of the local robotic process to generate a configuration;
executing, by the robotic process engine, the local robotic process utilizing the configuration, the execution of the local robotic process mirrors an execution of the distributed packaged robotic process without changing the distributed packaged robotic process.

2. The computing device of claim 1, wherein the at least one processor is configured to execute the robotic process engine to cause the computing device to save the configuration with respect to the local robotic process and separate from the distributed packaged robotic process.

3. The computing device of claim 1, wherein the at least one processor is configured to execute the robotic process engine to cause the computing device to require a receipt of at least one required input of the one or more input arguments before the execution of the local robotic process.

4. The computing device of claim 1, wherein the at least one processor is configured to execute the robotic process engine to cause the computing device to delete the configuration when the local robotic process is deleted.

5. The computing device of claim 1, wherein the one or more parameters comprise mechanisms defining features, ranges, properties, or conditions within the distributed packaged process.

6. The computing device of claim 1, wherein the one or more input arguments comprise simple or complex forms of settings, initial settings, or default settings.

7. The computing device of claim 1, wherein the one or more input fields comprise a process construction that is respective to different types of the one or more parameters and that receives corresponding input arguments.

8. The computing device of claim 1, wherein the distributed packaged process comprises a robot or a robotic process from a computing platform.

9. The computing device of claim 8, wherein the computing device comprises a local computing system in communication with the computing platform.

10. The computing device of claim 9, wherein the robotic process engine executes the local robotic process within the local computing system.

11. A method implemented by a robotic process engine stored as processor executable instructions on a memory coupled to at least one processor that executes the robotic process engine, the method comprising:
accessing, by the robotic process engine, a distributed packaged robotic process to procure code comprising one or more parameters and generate a local robotic process comprising one or more input fields in accordance with the one or more parameters;
receiving, by the robotic process engine, one or more input arguments via the one or more input fields of the local robotic process to generate a configuration;
executing, by the robotic process engine, the local robotic process utilizing the configuration, the execution of the local robotic process mirrors an execution of the distributed packaged robotic process without changing the distributed packaged robotic process.

12. The method of claim 11, wherein the robotic process engine saves the configuration with respect to the local robotic process and separate from the distributed packaged robotic process.

13. The method of claim 11, wherein the robotic process engine requires a receipt of at least one required input of the one or more input arguments before the execution of the local robotic process.

14. The method of claim 11, wherein the robotic process engine deletes the configuration when the local robotic process is deleted.

15. The method of claim 11, wherein the one or more parameters comprise mechanisms defining features, ranges, properties, or conditions within the distributed packaged process.

16. The method of claim 11, wherein the one or more input arguments comprise simple or complex forms of settings, initial settings, or default settings.

17. The method of claim 11, wherein the one or more input fields comprise a process construction that is respective to different types of the one or more parameters and that receives corresponding input arguments.

18. The method of claim 11, wherein the distributed packaged process comprises a robot or a robotic process from a computing platform.

19. The method of claim 18, wherein the computing device comprises a local computing system in communication with the computing platform.

20. The method of claim 19, wherein the robotic process engine executes the local robotic process within the local computing system.

* * * * *

UNITED STATES PATENT AND TRADEMARK OFFICE
CERTIFICATE OF CORRECTION

PATENT NO. : 11,759,950 B2
APPLICATION NO. : 17/150607
DATED : September 19, 2023
INVENTOR(S) : Brandon Nott and Florin-Radu Tapus Page 1 of 1

It is certified that error appears in the above-identified patent and that said Letters Patent is hereby corrected as shown below:

In the Specification

1. In Column 1, Line 11, delete "design" and insert -- design of --, therefor.

2. In Column 2, Line 62, delete "using referring" and insert -- referring--, therefor.

3. In Column 5, Line 27, delete "will be execute" and insert -- that will be executed --, therefor.

4. In Column 5, Line 31, delete "designed" and insert -- design --, therefor.

5. In Column 6, Line 23, delete "near-field communications" and insert -- near-field communication --, therefor.

6. In Column 9, Line 34, delete "example." and insert -- example, --, therefor.

7. In Column 10, Line 53, delete "the" and insert -- of the --, therefor.

8. In Column 12, Line 66, delete "alternative" and insert -- alternatively --, therefor.

9. In Column 13, Line 8, delete "accesses" and insert -- access --, therefor.

10. In Column 14, Line 29, delete "wire" and insert -- wire. --, therefor.

Signed and Sealed this
Twelfth Day of March, 2024

Katherine Kelly Vidal
*Director of the United States Patent and Trademark Office*